(12) United States Patent
Shao et al.

(10) Patent No.: US 12,230,962 B2
(45) Date of Patent: Feb. 18, 2025

(54) METHODS AND SYSTEMS FOR POWER-SUPPLY MANAGEMENT IN SMART URBAN BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN); Yaqiang Quan, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 386 days.

(21) Appl. No.: 17/663,210

(22) Filed: May 12, 2022

(65) Prior Publication Data

US 2023/0369857 A1    Nov. 16, 2023

(51) Int. Cl.
*H02J 3/00* (2006.01)
*H02J 3/14* (2006.01)

(52) U.S. Cl.
CPC .............. *H02J 3/004* (2020.01); *H02J 3/144* (2020.01)

(58) Field of Classification Search
CPC ........ H02J 3/004; H02J 3/144; H02J 2203/20; H02J 3/003; Y04S 10/50; G06Q 10/04; G06Q 50/06; G06F 16/252; H04L 67/12
See application file for complete search history.

(56) References Cited

U.S. PATENT DOCUMENTS

| 11,431,169 | B1 * | 8/2022 | Buttgenbach | H02J 3/004 |
| 2016/0335377 | A1 * | 11/2016 | Yamashina | G08G 1/0112 |
| 2021/0234372 | A1 * | 7/2021 | Inoue | H02J 3/004 |

FOREIGN PATENT DOCUMENTS

| CN | 113837434 | A | * | 12/2021 |
| CN | 114021420 | A | * | 2/2022 |
| CN | 114169615 | A | * | 3/2022 |
| JP | 2017121133 | A | * | 7/2017 |
| KR | 102444254 | B1 | * | 9/2022 |

OTHER PUBLICATIONS

White Paper on Urban Brain Development, Smart City Standard Working Group of National Beacon Commission, 2022, 59 pages.
(Continued)

*Primary Examiner* — Mohammad Ali
*Assistant Examiner* — Dhruvkumar Patel
(74) *Attorney, Agent, or Firm* — METIS IP LLC

(57) ABSTRACT

The embodiments of the present disclosure provide methods and systems for power-supply management in a smart urban based on Internet of things (IoT), performed by an urban power-supply management platform. The method includes obtaining a first power-generation data by a sensor network platform; wherein the first power-generation data is determined by summarizing second power-generation data, and the second power-generation data is residential self-power-generation data; determining a power-supply prediction based on first power-generation data and environmental data; and sending the power-supply prediction to the power-supply company.

11 Claims, 6 Drawing Sheets

(56) References Cited

OTHER PUBLICATIONS

Shao, Zehua, Exploration and Research on the Structure of Internet of Things, Internet of Things Technologies Reliable Transmission, 2015, 10 pages.
Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.

* cited by examiner

METHODS AND SYSTEMS FOR POWER-SUPPLY MANAGEMENT IN SMART URBAN BASED ON INTERNET OF THINGS

TECHNICAL FIELD

The present disclosure relates to the field of the Internet of things and cloud platforms, in particular to a method and system for power-supply management in smart urban.

BACKGROUND

The traditional extensive method and system power-supply management do not meet the requirements of the times and do not comprehensively consider the reasonable matching between the power-supply capacity of the power grid and the needs of users, resulting in the unreasonable power supply of the power grid to a certain extent. In recent years, with the development of information science and technology, the concept and the application in the Internet of things of the cloud platform have been mentioned by more and more people. The cloud platform service mode with cloud computing as the core service can solve the problem of the insufficient information processing capacity of each platform of the Internet of things through scale gain and resource sharing. The introduction of the cloud platform may provide efficient, dynamic, and large-scale scalable computing power for the Internet of things, and enable the user-led Internet of things to run better and more efficiently.

Therefore, it is desirable to provide a method and system for smart urban power-supply management based on the Internet of things, use the Internet of things and cloud platform to improve the efficiency and universality of the method and system of power-supply management and realize the fine management of power supply.

SUMMARY

One aspect of some embodiments of the present disclosure provides a method of power-supply management in a smart urban based on Internet of things (IoT), performed by an urban power-supply management platform. The method includes: obtaining first power-generation data by a sensor network platform; wherein the first power-generation data is determined by summarizing second power-generation data, and the second power-generation data is residential self-power-generation data; determining a power-supply prediction based on the first power-generation data and environmental data; and sending the power-supply prediction to a power-supply company.

One aspect of some embodiments of the present disclosure provides a system for power-supply management in a smart urban based on the Internet of things (IoT). Wherein the system includes an urban power-supply management platform, a sensor network platform, an object platform, wherein the urban power-supply management platform is configured to perform the following operation including: obtain first power-generation data by the sensor network platform; wherein the first power-generation data is determined by the sensor network platform summarizing second power-generation data, the second power-generation data is residential self-power-generation data; determine a power-supply prediction based on the first power-generation data and environmental data; and send the power-supply prediction to a power-supply company.

One aspect of some embodiments of the present disclosure provides a computer-readable storage medium storing computer instructions, wherein when reading the computer instructions in the storage medium, a computer executes the method of power-supply management in a smart urban based on the Internet of things (IoT).

BRIEF DESCRIPTION OF THE DRAWINGS

The present disclosure is further described in terms of the exemplary embodiments, and these exemplary embodiments are described in detail by reference to the drawings. These embodiments are non-limiting exemplary embodiments. In these embodiments, the same numerals represent the same structure, wherein.

DETAILED DESCRIPTION

Figure 1:
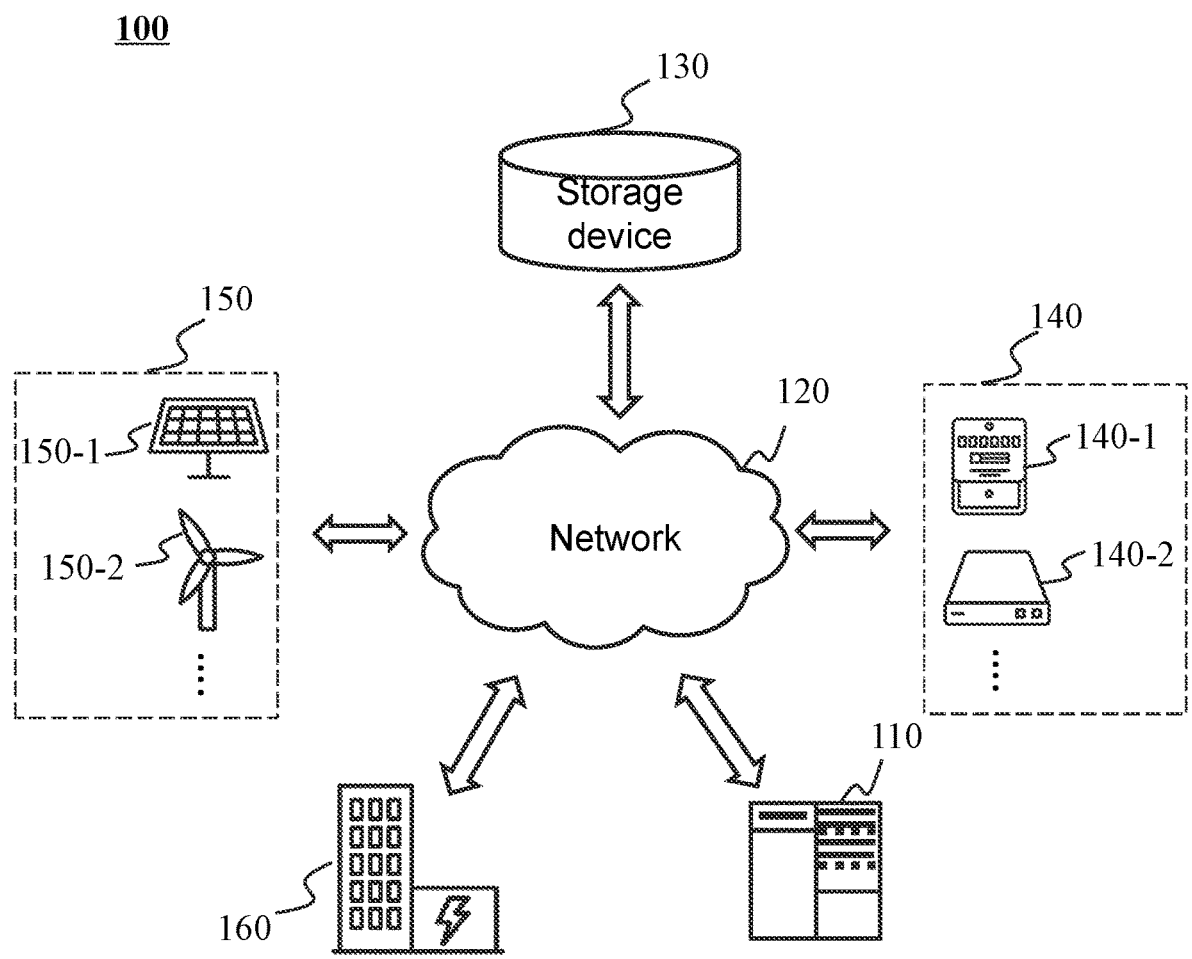
FIG. 1 is a schematic diagram illustrating an exemplary application scenario of a system for power-supply management in a smart urban based on the Internet of things according to some embodiments of the present disclosure.

In order to illustrate the technical solution of embodiments of the present disclosure more clearly, the following briefly introduces the accompanying drawings that are used in the description of the embodiments. Obviously, the drawings described below are only some examples or embodiments of the present disclosure. For those skilled in the art, the present disclosure may also be applied to other similar situations according to these drawings without paying further creative efforts. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

As shown in description and claims, the singular forms "a," "an," and "the" may be intended to include the plural forms as well, unless the context indicates otherwise. In general, the terms "include" and/or "comprises" only imply that the clearly identified steps and elements are included, and these steps and elements do not constitute an exclusive list, and the method or devices may also contain other steps or elements.

The flowcharts used in the present disclosure illustrate operations that systems implement according to some embodiments of the present disclosure. It is to be expressly understood that the preceding or following operations are not necessarily performed accurately in order. Conversely, the operations may be processed in an inverted order, or simultaneously. Moreover, one or more other operations may be added to the flowcharts. One or more operations may be removed from the flowcharts.

FIG. 1 is a schematic diagram illustrating an exemplary application scenario of a system for power-supply management in a smart urban based on the Internet of things according to some embodiments of the present disclosure.

In some embodiments, the application scenario 100 of the system of power-supply management may at least includes a processing device 110, a network 120, a storage device 130, a collection terminal 140, a power-generation device 150, and a power-supply company 160. In some embodiments, components in the application scenario 100 may connect and/or communicate with each other via the network 120 (e.g., wireless connection, wired connection, or a combination thereof). For example, the processing device 110 may be connected to the storage device 130 through the network 120. As another example, the collection terminal 140 may be connected to the processing device 110 and the storage device 130 through the network 120.

The processing device 110 may be configured to process information and/or data related to the application scenario 100, e.g., first power-generation data, second power-generation data, or the like. The processing device 110 may process data, information, and/or processing results obtained from other devices or system components, and execute program instructions based on these data, information, and/or processing results to perform one or more functions described in the present disclosure.

The network 120 may connect various components of the application scenario 100 and/or connect the application scenario 100 with external resources. The network enables the communication between components and with other parts outside the application scenario 100 to facilitate the exchange of data and/or information. The network may be a local area network, a wide area network, an Internet, etc., and may be a combination of various network structures.

The storage device 130 may be configured to store data and/or instructions. In some embodiments, the storage device 130 may store data and/or instructions that the processing device 110 executes or uses to accomplish the exemplary methods described in the present disclosure. In some embodiments, the storage device 130 may be connected to the network 120 to communicate with one or more components of the application scenario 100 (e.g., the processing device 110, the collection terminal 140).

The collection terminal 140 may be configured to collect data and/or information. For example, the second power-generation data, etc. Exemplary collection terminals 140 may include a smart meter 140-1, an energy router 140-2, or the like. In some embodiments, the collection terminal may transmit the collected data and/or information through the network to the processing device. For more information about the collection terminal, see FIG. 2 and its description.

The power-generation device 150 may be configured to convert other forms of energy into electrical energy. The other forms of energy may refer to energy other than electric energy, such as mechanical energy, internal energy, wind energy, etc. Exemplary power-generation devices 150 may include a solar power-generation device 150-1, a wind power-generation device 150-2, or the like. The power-generation device may supply the generated electrical energy to the user to use and/or the power-supply company to dispatch.

The power-supply company 160 may be configured to supply and/or dispatch electrical energy. For example, the power-supply company may supply the electrical energy to users. As another example, the power-supply company may dispatch electrical energy from areas with low power consumption to areas with high power consumption (e.g., West-to-East Power Transmission Project). Exemplary power-supply companies may include various municipal power supply companies under the State Grid or China Southern Power Grid.

It should be noted that the application scenario is provided for illustrative purposes only and is not intended to limit the scope of the present disclosure. For those ordinary skilled in the art, various modifications or changes may be made according to the description of the present disclosure. For example, the application scenario may also include a database. As anther example, the application scenario may be implemented on other devices to achieve similar or different functions. However, changes and modifications do not depart from the scope of the present disclosure.

The Internet of things system may be an information processing system including part or all of the management platform, the sensor network platform, the object platform. The management platform may realize the overall planning and coordination of the connection and cooperation between various functional platforms (e.g., the sensor network platform, the object platform). The management platform gathers the information of the operating system of the Internet of things, and may provide perceptual management and control management functions for the operation system of the Internet of things. The sensor network platform may implement the connection of the management platform and the object platform, and plays the functions of perceptual information sensing communication and control information sensing communication. The object platform is a functional platform for performing perceptual information generation and control information.

The processing of information in the Internet of things system may be divided into processing flow of perceptual information and processing flow of control information, and the control information may be information generated based on the perceptual information. The processing of perceptual information is that the object platform obtains the perceptual information and transmits it to the management platform through the sensor network platform. The control information is sent from the management platform to the object platform through the sensor network platform, so as to realize the control of the corresponding object.

In some embodiments, when the Internet of things system is applied to urban management, it may be referred to as the system of power-supply management in a smart urban based on the Internet of things.

Figure 2:
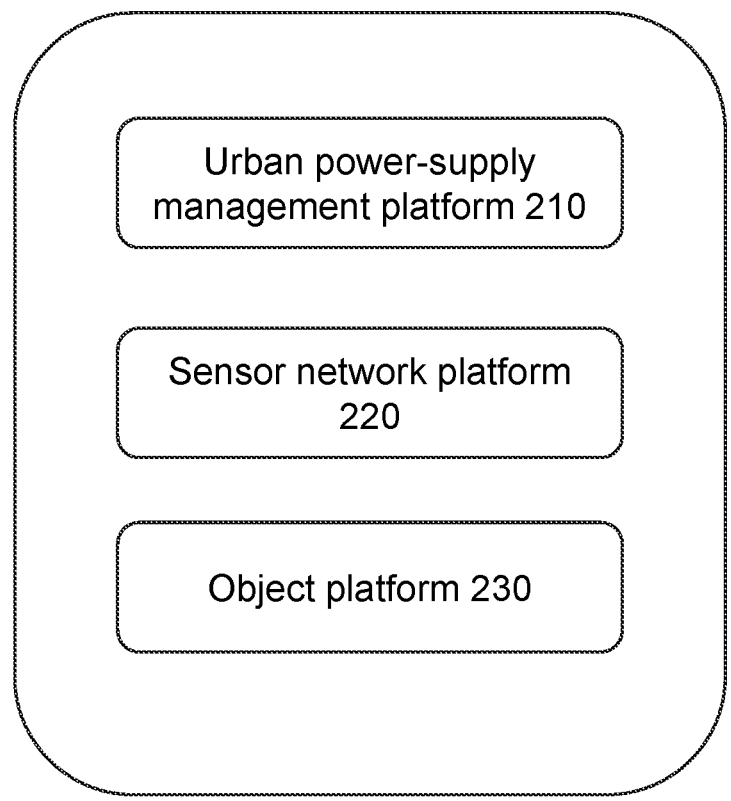
FIG. 2 is a schematic diagram illustrating an exemplary system for power-supply management in a smart urban based on the Internet of things according to some embodiments of the present disclosure.

FIG. 2 is a schematic diagram illustrating an exemplary system for power-supply management in a smart urban based on the Internet of things according to some embodiments of the present disclosure. As shown in FIG. 2, the system 200 for the power-supply management in a smart urban, hereinafter referred to as system 200, may be implemented based on the Internet of things system, the system 200 includes an urban power-supply management platform 210, a sensor network platform 220, and an object platform 230. In some embodiments, the system 200 may be part of or implemented by the processing device 110.

In some embodiments, the system 200 may be applied to a variety of scenarios of the power-supply management. In some embodiments, the system 200 may obtain power-supply related data and power consumption related data in a variety of scenes, respectively, so as to obtain power-supply management strategies in each scenario. In some embodiments, the system 200 may obtain the power-supply management strategy of the entire area (e.g., the entire urban) based on the obtained power-supply related data and power consumption related data in each scenario.

The various scenarios of power-supply management may include power consumption scenario, power supply scenario, power transmission scenario, etc. For example, it may include the operational management of the power supply device, power transmission management, safe power consumption management, power-supply prediction management, etc. It should be noted that the above scenarios are only examples and do not limit the specific application scenarios of the system 200. Those skilled in the art may apply the system 200 to any other suitable scenarios based on the contents disclosed in the embodiment.

In some embodiments, the system 200 may be applied to the operation management of the power-supply device. When applied to the operation management of the power-supply management, the object platform 230 may be configured to obtain data related to the power-supply device, such as the operation data of the power-supply device, e.g., running time, device model, maintenance data, operating temperature, manufacturer, etc. The object platform 230 may upload the obtained data related to the power-supply device to the sensor network platform 220. The sensor network platform 220 may summarize and process the collected data. For example, the sensor network platform 220 may classify the collected data by an area, device model, service life, etc. The sensor network platform 220 then uploads the further summarized and processed data to the urban power-supply management platform 210, and the urban power-supply management platform 210 makes strategies or instructions (such as device replacement instructions, maintenance instructions, detection instructions, fault prediction, etc.) related to the operation management of power-supply device based on the processing of the collected data.

In some embodiments, the system 200 may be applied to power transmission management. When applied to the power transmission management, the object platform 230 may be configured to obtain the data related to power transmission, such as power consumption data in each area, device data of the power transmission device, or the like. The object platform 230 may upload data related to power transmission to the sensor network platform 220. The sensor network platform 220 may summarize and process the collected data. For example, the sensor network platform 220 may determine the power consumption in each area by dividing the collected data according to areas, and divide the data according to the type of power transmission device. The sensor network platform 220 then uploads the further summarized and processed data to the urban power-supply management platform 210, and the urban power-supply management platform 210 makes strategies or instructions related to power transmission management based on the processing of the collected data, such as the determination of transmission mode, transmission volume, transmission point, etc.

In some embodiments, the system 200 may be applied to safe power management.

When applied to safe power consumption management, the object platform 230 may be configured to collect data related to power usage, such as data related to the power consumption device, data related to power transmission device, data related to power-generation device, etc. The object platform 230 may upload the collected data related to power usage to the sensor network platform 220. The sensor network platform 220 may summarize and process the collected data. For example, the sensor network platform 220 may classify the collected data according to the power usage mode, the power generation mode, etc. The sensor network platform 220 then uploads the further summarized and processed data to the urban power-supply management platform 210, and the urban power-supply management platform 210 makes strategies or instructions related to safe power consumption management based on the processing of the collected data, such as prediction of accident causes, prediction of risk points, prediction of power data within the scope of safe power consumption, etc.

In some embodiments, the system 200 may be applied to power prediction management. When applied to the power-supply prediction management, the object platform 230 may be configured to collect data related to the power supply and use, such as power generation data, the data of power-generation device, the data of power consumption device, and the environmental data, etc. The object platform 230 may upload the data related to the power-supply prediction to the sensor network platform 220. The sensor network platform 220 may summarize and process the collected data. For example, the sensor network platform 220 may classify the collected data according to power generation mode, power generation or power consumption area, power generation time, etc. The sensor network platform 220 then uploads the further summarized and processed data to the urban power-supply management platform 210, and the urban power-supply management platform 210 makes strategies or instructions related to power-supply prediction management based on the processing of the collected data, such as power demand data, the available power generation data based on self-power-generation, etc.

In some embodiments, the system 200 may be composed of a plurality of subsystems of smart urban power-supply management based on the Internet of things, and each subsystem may be applied to one scenario. The system 200 may comprehensively manage and process the data obtained and output by each subsystem, and then obtain relevant strategies or instructions to assist the power-supply management in a smart urban based on the Internet of things.

For example, the system 200 may include a subsystem applied to the operation management of power-supply device, a subsystem applied to power transmission management, a subsystem applied to safe power consumption management, and a subsystem applied to power-supply prediction management. The system 200 may be a superior system of each subsystem.

The following will take the system 200 managing each subsystem and obtaining corresponding data based on the subsystems to obtain the strategy for smart urban power-supply management based on the Internet of things as an example for description:

The system 200 may obtain the replacement instruction, maintenance instruction, detection instruction, fault prediction, and other data of the power-supply device based on the subsystem of operation management of power-supply device, obtain the prediction data of power transmission mode, transmission volume, and transmission point based on the subsystem of safe power transmission management, and obtain the prediction data of power accident causes, risk points and power data within the scope of safe power consumption based on the subsystem of safe power consumption management, and based on the power-supply prediction management subsystem, obtain the power demand data and the self-power-generation available power data based on the subsystem of the power-supply prediction management subsystem.

During the above data obtaining, the system 200 may separately set a plurality of object platforms for data obtaining corresponding to each subsystem.

After obtaining the above data, the system 200 summarizes and processes the collected data through the sensor network platform 220. The sensor network platform 220 then uploads the further summarized and processed data to the urban power-supply management platform 210, and based on the processing of the collected data, the urban power-supply management platform 210 makes the prediction data related to the power-supply management in a smart urban based on the Internet of things based on the processing of the collected data.

For example, the sensor network platform 220 may determine prediction of the normal working time of the power-supply device based on the replacement instruction, maintenance instruction, detection instruction, or the like of the power-supply device. The sensor network platform 220 may, based on the power demand data and the self-power-generation available power data, determine the power data that the power-supply company need to send when the normal power consumption of the area is ensured. The sensor network platform 220 may upload the above data to the urban power-supply management platform 210. The urban power-supply management platform 210 may determine the count of required power-supply devices or the efficiency adjustment data of the power-supply devices based on the above prediction of normal working time, the power data needed to be sent in combination with the current efficiency data of the power-supply devices.

As another example, the sensor network platform 220 may predict the risk of a safety accident occurring at each transmission point under various transmission modes based on the prediction data of transmission modes, transmission volume, transmission points, as well as the prediction data of safety accident causes and risk points. The sensor network platform 220 may upload the prediction data to the urban power-supply management platform 210, and the urban power-supply management platform 210 determines the setting data (e.g., the location of the transmission point, the transmission mode of the transmission point, the transmission volume, etc.) of the power transmission point based on the above prediction data.

As another example, the sensor network platform 220 may comprehensively determine the area power consumption data, area power-generation prediction data, area accident probability prediction, etc. based on replacement instruction, maintenance instruction, detection instruction, fault prediction of the device, the prediction data of transmission mode, prediction data of transmission volume, prediction data of transmission point, prediction of accident cause, prediction of risk point, prediction of electric energy data within the safe power consumption range, prediction of power demand data, prediction of power available based on self-power-generation in combination with area division information The sensor network platform 220 may upload the above information to the urban power-supply management platform 210, and the urban power-supply management platform 210 determines the area power supply plan, the inter-area power transfer scheme, and the area risk investigation strategy based on the above information.

For those skilled in the art, after understanding the principle of the system, it is possible to move the system to any other suitable scene without departing from this principle.

The following will take the application of the system 200 to a power-supply prediction management scenario as an example to describe the system 200 in detail.

The urban power-supply management platform 210 may refer to a platform for managing power-supply in a city. In some embodiments, the urban power-supply management platform 210 may belong to a management platform. The urban power-supply management platform 210 may be configured to obtain the first power-generation data through the sensor network platform. The first power-generation data is determined by summarizing the second power-generation data through network communication between the sensor network platform and the collection terminal, and the second power-generation data is residential self-power-generation data. The urban power-supply management platform 210 may be configured to determine a power-supply prediction based on the first power-generation data and the environmental data. The urban power-supply management platform 210 may be configured to send the power-supply prediction to power-supply company.

In some embodiments, the urban power-supply management platform may also be configured to obtain the second power-generation data from the collection terminal in a staggered manner based on the sensor network platform; determine the first power-generation data by summarizing and processing the second power-generation data based on the sensor network platform; obtain the first power-generation data based on the sensor network platform in a staggered manner.

In some embodiments, the urban power-supply management platform may also be configured to determine the power-supply prediction based on the first power-generation data and the environmental data through the first prediction model.

In some embodiments, the first power-generation data includes at least one of the first distribution information and the second distribution information of the residential self-power-generation data; the first distribution information includes distribution information according to power generation mode, and the second distribution information includes distribution information according to time.

In some embodiments, the environmental data includes weather forecast data and traffic flow data.

In some embodiments, the urban power-supply management platform may also be configured to divide the area where the power supply terminal is located according to trunk roads of road traffic; obtain the traffic flow of each area as the environmental feature, and through the first prediction model, determine the power-supply prediction for each area based on the first power-generation data and the environmental feature.

Figure 3:
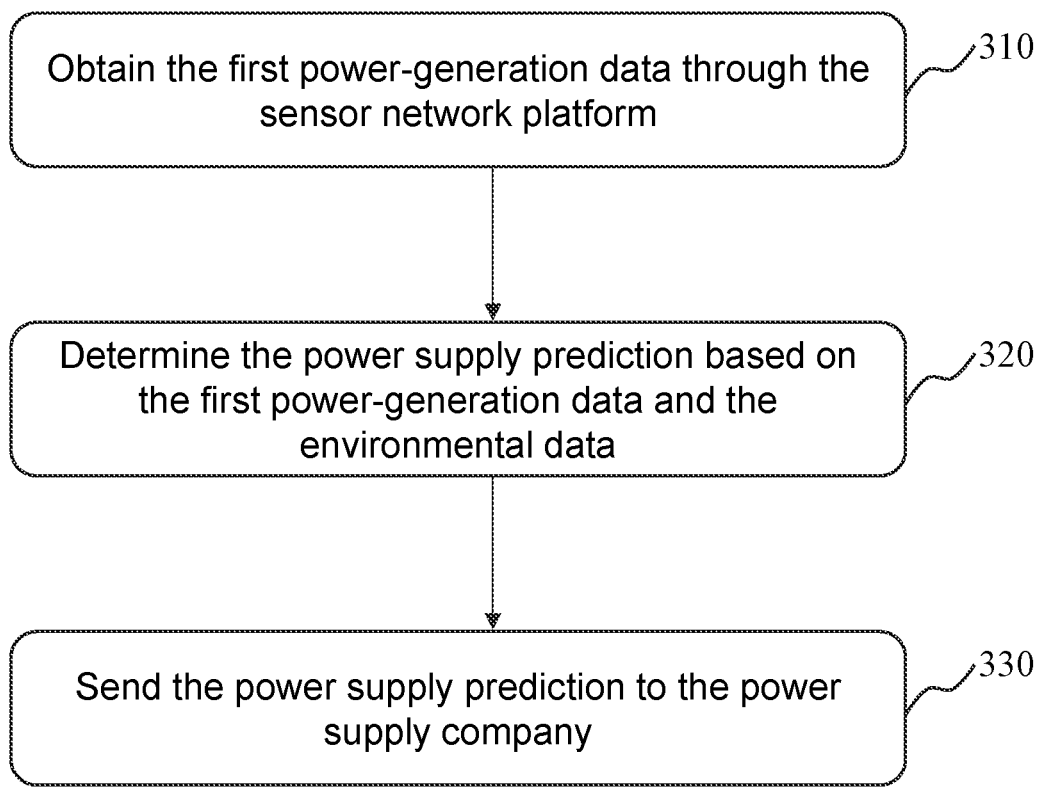
FIG. 3 is a flowchart illustrating an exemplary process of power-supply management in a smart urban based on the Internet of things according to some embodiments of the present disclosure.
Figure 4:
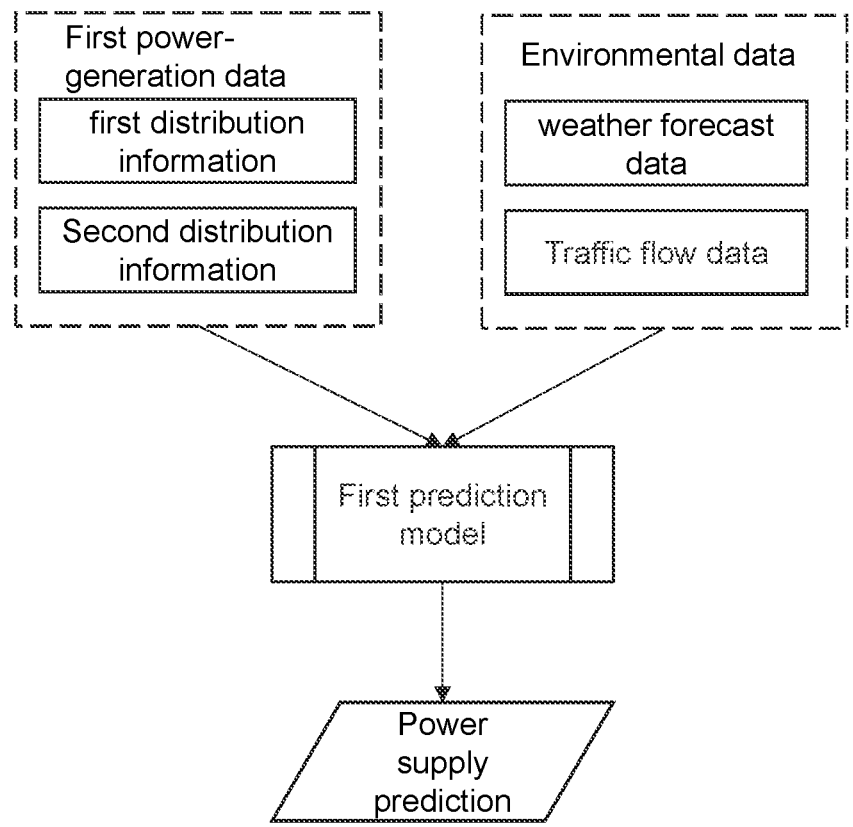
FIG. 4 is a flowchart illustrating an exemplary process for determining power-supply prediction according to some embodiments of the present disclosure.
Figure 5:
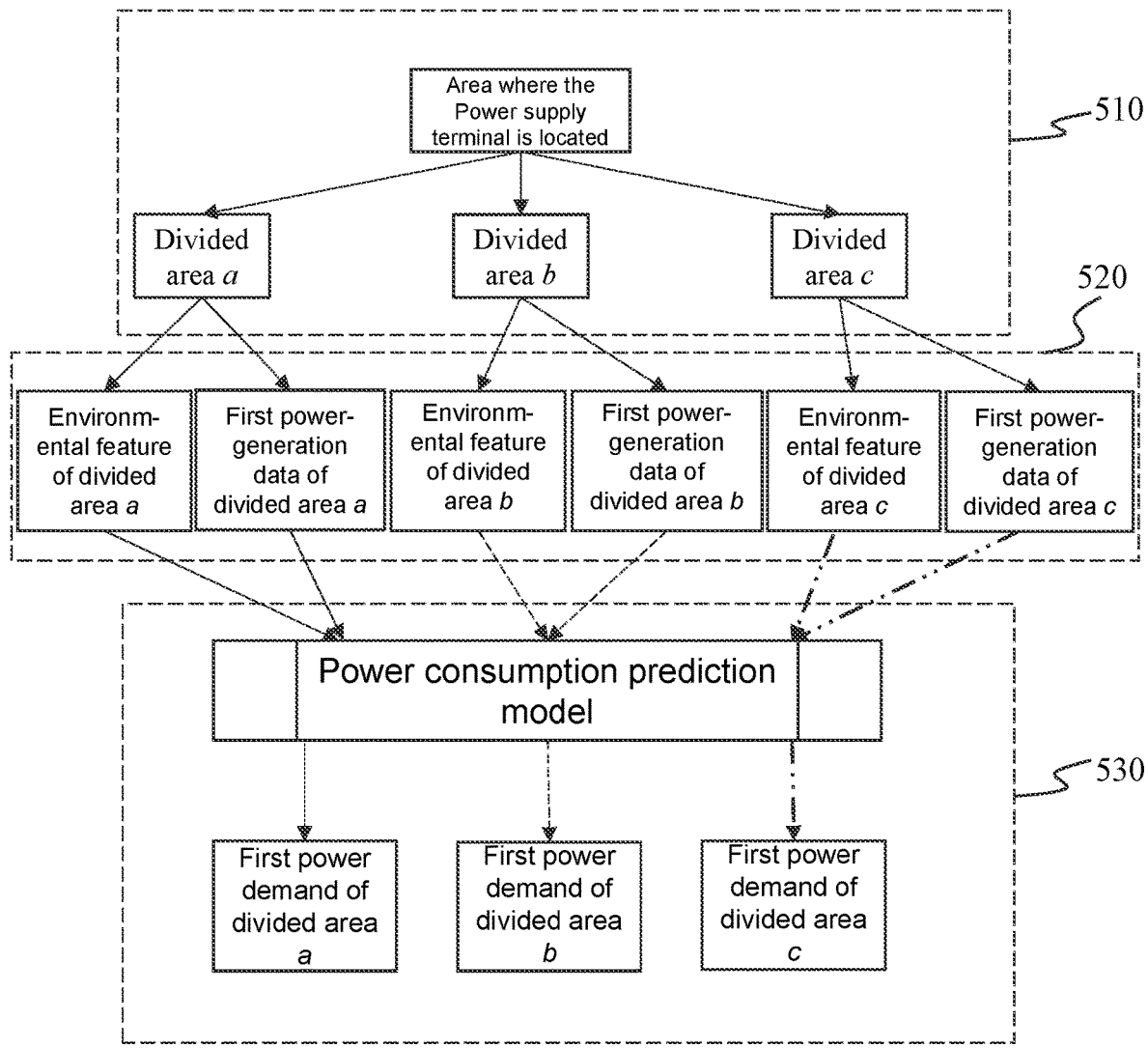
FIG. 5 is a flowchart illustrating an exemplary process for determining the first power demand according to some embodiments of the present disclosure.

More details on the urban power-supply management platform 210 may be found in FIGS. 3-5 and its description.

The sensor network platform 220 may refer to a platform for unified management of sensing communication, the sensor network platform 220 may also be referred to as a sensor network management platform or sensor network management server. In some embodiments, the sensor network platform may connect to the management platform and the object platform to achieve the function of perceptual information sensing communication and control information sensing communication.

The management platform may refer to a platform for managing and/or controlling the Internet of things, for example, overall planning and coordinating the connection and cooperation between various functional platforms. The management platform gathers all the information of the Internet of things and may provide control and management functions for the normal operation of the Internet of things.

The object platform may refer to the functional platform for perceptual information generation and control information execution, and is the final platform for the realization of the user's will. In some embodiments, the object platform may obtain information. The obtained information may be configured as the information input of the whole Internet of things.

The perceptual information may refer to the information obtained by the physical entity, for example, the information obtained by the sensor. The control information may refer to the control information (e.g., control instructions) formed after performing processing (such as identification, verification, analysis, and conversion) on the perceptual information.

In some embodiments, the sensor network platform may communicate with the urban power-supply management platform to provide related information and/or data (e.g., the first power-generation data) for the urban power-supply management platform.

The object platform 230 may communicate with the sensor network platform, and the object platform 230 may be configured as a collection terminal to obtain data.

The collection terminal may refer to the device that collects data related to electrical energy, for example, a power meter that can capture power consumption and/or power generation. The power consumption may refer to the amount of power consumed, for example, the power consumed by using air conditioning. The power generation may refer to the amount of power generated by the power-generation device, for example, the amount of power generated by a solar power plant.

In some embodiments, the collection terminal may be managed by an object platform. The information obtained by the collection terminal may be configured as the information input of the whole Internet of things.

It should be noted that the above descriptions of the system and its components are only for the convenience of description and cannot limit the present disclosure to the scope of the embodiments. It may be understood that after understanding the principle of the system, those skilled in the art may arbitrarily combine various components or form a subsystem to connect with other components without departing from this principle. For example, the sensor network platforms and the urban power-supply management platform may be integrated into one component. As another example, each component may share one storage device, and each component may also have its own storage device. Such deformation is within the protection scope of the present disclosure.

FIG. 3 is a flowchart illustrating an exemplary process for power-supply management in a smart urban based on the Internet of things according to some embodiments of the present disclosure. As shown in FIG. 3, the process 300 includes the following steps. In some embodiments, the process 300 may be executed by the urban power-supply management platform 210.

In step 310, the urban power-supply management platform 210 obtains the first power-generation data through the sensor network platform.

The sensor network platform may refer to a platform for unified management of sensing communication. For more details about the sensor network platform, see FIG. 2 and its description.

The first power-generation data may refer to the power-generation data summarized according to areas and time based on the second power-generation data. The areas may refer to artificially divided areas. The time may include year, month, day, etc. For example, the power-generation data is summarized according to the administrative area and winter based on the second power-generation data. The second power-generation data is described below. For more details on the first power-generation data, see FIG. 4 and its description.

In some embodiments, the first power-generation data may be determined by summarizing the second power-generation data through network communication between the sensor network platform and the collection terminal.

The collection terminal may refer to the device that collects data related to electrical energy. For more details about the collection terminal, see FIG. 2 and its description. In some embodiments, the collection terminal may include a smart meter and/or an energy router. Wherein, the smart meter may be configured to collect self-power-generation data from each residential users. The energy router may be configured to collect self-power-generation data from multiple residential users in one or more communities.

The network communication may refer to sensing communication based on sensor network. The network communication may include public network and private network. The public network may refer to a network operated by a telecommunications operator, e.g., 4G, 5G, NB-IoT, etc. When communicating with the public network, there is no need to further build a network. The private network may refer to the network operated by non-telecom operators and constructed in accordance with the law. The private network for private use generally, e.g., LoRa, SigFox, etc. When using the private network for communication, it is generally necessary to set up an Internet of things gateway.

The second power-generation data may refer to residential self-power-generation data. The residential self-power-generation data may refer to power obtained by users through the power-generation device. For example, the second power-generation data may include residential energy obtained through solar power, wind power, or the like.

Summary processing may refer to bringing together different data. For example, bring together the second power-generation data at different times. As another example, bring together the second power-generation data at different geographies. In some embodiments, the summary processing may be performed in the sensor network platform 220.

In some embodiments, the urban power-supply management platform 210 may communicate with the sensor network platform to obtain the first power-generation data. For example, the urban power-supply management platform 210 may obtain the first power-generation data from the sensor network platform through the network 120.

In some embodiments, the urban power-supply management platform may adopt different strategies to obtain the first power-generation data from the sensor network platform based on a variety of factors such as network bandwidth, network rate, and processing device load. For example, at present, the load of the processing device is high, and the urban power-supply management platform may obtain a small amount of the first power-generation data from the sensor network platform each time but for multiple times. As another example, at the present, the load of the processing device is low, and the network rate is fast, the urban power-supply management platform may obtain a large amount of the first power-generation data from the sensor network platform each time but for less times.

In some embodiments, the urban power-supply management platform obtains the first power generation data by the sensor network platform may include obtaining the second power-generation data from the collection terminal based on the sensor network platform in a staggered manner; determining the first power-generation data by the summary processing of the second power-generation data through the sensor network platform; obtaining the first power-generation data based on the sensor network platform in a staggered manner.

The staggered manner may refer to the different steps and/or operations that are not carried out at the same time, for example, obtaining the second power-generation data during the daytime, and obtaining the first power-generation data at night. In some embodiments, the staggered manner may include obtaining or uploading the power-generation data of different communities at different time periods, for example, obtaining the second power-generation data of community A in the daytime, and uploading the first power-generation data of community B at night.

The sensor network platform obtains the data in the staggered manner to avoid traffic concentration, mitigate network pressure and the load of the processing device.

In step 320, the urban power-supply management platform 210 determines the power-supply prediction based on the first power-generation data and the environmental data.

The environmental data may refer to weather data corresponding to the area. The weather data may refer to the data related to the weather, e.g., temperature, air pressure, wind speed, etc. The urban power-supply management platform may obtain the environmental data in a variety of ways, for example, from the storage device; as another example, through invoking the weather API (e.g., Gao De Weather API, Open Weather API, etc.). For more details on environmental data, see FIG. 4 and its description.

The power-supply prediction may refer to the prediction of excess power energy of the self-power-generation that can be provided by the users in the assessed area after satisfying their own use. For example, it is predicted that, when the power of self-power-generation is the 200 kWh, excess 100 kWh power energy can be provided after satisfying its own use demand of 100 kWh power energy.

In some embodiments, the urban power-supply management platform may determine power supply prediction based on the first power-generation data and the environmental data. In some embodiments, the urban power-supply management platform may determine the user's self-power-generation data and the user's total power consumption data based on the first power generation data and the environmental data and then determine the power-supply prediction. For example, the urban power-supply management platform may subtract the user's self-power-generation data and the user's total power consumption data, and determine the difference between the two as the power-supply prediction. More details on determining the power-supply prediction based on the first power-generation data and the environmental data may be seen in FIG. 4 and its description.

In step 330, the urban power-supply management platform 210 sends the power-supply prediction to the power-supply company.

The power-supply company may refer to the company that can supply and/or dispatches power, for example, the municipal power-supply company under the State Grid or China Southern Power Grid.

In some embodiments, the urban power-supply management platform may transmit the power-supply prediction to the power-supply company through the network 120. In some embodiments, the power-supply company may adjust the power supply of different areas based on the power-supply prediction. For example, the power-supply company may supply more power to area a assuming that the power-supply prediction of area a is 0.

In some embodiments, the urban power-supply management platform may also send intermediate data required to determine the power-supply prediction to the power-supply company, for example, the first power-generation data, the second power-generation data, or the like.

In some embodiments of the present disclosure, the first power-generation data is obtained by summarizing the second power-generation data, and thus the first power-generation data at different areas and/or times can be obtained. The power-supply prediction may be determined based on the first power-generation data and the environmental data, which improves the accuracy of power-supply prediction.

FIG. 4 is a flowchart illustrating an exemplary process for determining power-supply prediction according to some embodiments of the present disclosure. In some embodiments, process 400 may be performed by the urban power-supply management platform 210.

In some embodiments, the urban power-supply management platform may determine the power-supply prediction based on the first power-generation data and the environmental data through the first prediction model.

The first prediction model may refer to the machine learning model after training. In some embodiments, the first prediction model may include other models, for example, any one or combination of the deep neural network model, cyclic neural network model, convolutional neural network, or other custom model structures.

In some embodiments, when training the first prediction model, a plurality of labeled training samples may be used for training through a variety of methods (e.g., gradient descent method), so that the parameters of the model can be learned. When the training model satisfies the preset conditions, the training ends, and the trained first prediction model is obtained.

The training samples may include historical first power-generation data, historical environmental data in, for example, a month, a quarter, and a year. The label of training samples may be historical power supply data. The label of training samples may be obtained by manual marking. In some embodiments, the first prediction model may be trained in another device or module.

The first power-generation data may include more information related to power generation, for example, information related to the power generation process (e.g., the time required for power generation), information related to the power-generation device (e.g., output power), etc. In some embodiments, the first power-generation data may include at least one of the first distribution information and the second distribution information of the residential self-power-generation data.

The first distribution information may refer to the information presented by the distribution of residential self-power-generation data in some way. In some embodiments, the first distribution information may include distribution information according to power generation mode. For example, the residential self-power-generation data generated by one power generation mode is distributed in area a, and the residential self-power-generation data generated by another power generation mode is distributed in area b.

The power generation mode may refer to the manner of generating power. For example, the power generation mode of solar power-generation devices is solar power generation, and the power generation mode of wind power-generation devices is wind power generation.

The second distribution information may refer to the information presented by the distribution of residential self-power-generation data in another way. In some embodiments, the second distribution information may include distribution information by time. For example, the residential self-power-generation data generated in one period of time is distributed in area a, and the residential self-power-generation data generated in another period of time is distributed in area b.

The time may be a measure of the duration of power generation, for example, year, month, day, etc., as another example, spring, summer, autumn, winter, etc.

In some embodiments, the urban power-supply management platform may determine the power-supply prediction according to the environmental data based on the first distribution information and/or the second distribution information. For example, the urban power-supply management platform may obtain that the power generation mode of power generation through solar energy is distributed in area a based on the first distribution information, and according to the environmental data of area a that only 90 days are sunny days in one year, determine the power-supply prediction that the power supply of area a is predicted to be little or zero. As another example, the urban power-supply management platform may obtain the residential self-power-generation data generated from 9:00 to 10:00 every morning distributed in area a based on the second distribution information, and according to the environmental data of area a is cloudy and windless in the next three days, determine the power-supply prediction that the power supply of area a is predicted to be zero.

In some embodiments, the power-supply management platform may input the first distribution information and/or the second distribution information, and the environmental data to the first prediction model, and obtain the power-supply prediction. See FIG. 4 for the description of the first prediction model.

By using the first distribution information and the second distribution information included in the first power-generation data, and the weather forecast data and traffic flow data included in the environmental data, power-supply prediction may be performed in mutilate dimensions, so as to improve the accuracy of power-supply prediction. For example, in the same area, the power generation in summer is generally higher than that in winter.

The environmental data may include more information related to the corresponding area, for example, people traffic, distribution of shopping malls, etc. In some embodiments, the environmental data may include weather forecast data and traffic flow data.

Weather forecast data may refer to the data involved in the weather forecast, for example, temperature, precipitation, wind speed, wind direction, air pressure, humidity, cloud volume, etc.

In some embodiments, the weather forecast data may be used for the prediction of residential self-power-generation data and the prediction of total power consumption data. Exemplary, when the power generation mode is solar power generation or wind power generation, the weather may affect the power generation. For example, when it is sunny, it is conducive to solar power generation and may produce more power. As another example, when the wind speed is fast, it is conducive to wind power generation and may produce more power. At the same time, the weather may also have an impact on power consumption. For example, when the temperature is too high or too low, the usage rate of the air conditioner will increase, which in turn leads to an increase in electricity.

The traffic flow data may refer to the count of vehicles and pedestrians passing through a certain position of the road in a unit of time. For example, the traffic flow data may include bus data, private car data, electric vehicle data, pedestrian data, etc. In some embodiments, the traffic flow data may reflect the degree of congestion and/or popularity of the road.

In some embodiments, the traffic flow data may be configured to predict total power consumption data in the area. In some embodiments, the urban power-supply management platform may analyze and process the data of electric vehicles included in the traffic flow data, determine the total count of electric vehicles in the area, and then predict the power consumption data in the area based on the power required to charge electric vehicles.

The power required for electric vehicle charging may refer to the power required to maintain the normal operation of the electric vehicle, for example, the amount of electricity to be consumed when the electric vehicle is fully charged. The urban power-supply management platform may obtain the power required for electric vehicle charging based on a variety of ways. For example, the power required to charge an electric vehicle may be obtained based on manual input. As another example, the corresponding information may be obtained from the network based on information such as the model of the electric vehicle.

The urban power-supply management platform may predict the total power consumption data in the area based on the count of electric vehicles in the area. For example, the urban power-supply management platform determines that there are 20 electric vehicles in the area based on the data of electric vehicles, and the power required for the electric vehicles to be fully charged based on manual input, e.g., 60 kWh. The urban power-supply management platform may multiply the above two data and predict the total power consumption data in the prediction area is 1200 kWh based on the multiplication result of 1200 kWh.

In some embodiments, the urban power-supply management platform may input the first distribution information and/or the second distribution information, as well as the weather forecast data and/or traffic flow data into the first prediction model to obtain the power-supply prediction. See FIG. 4 for the description of the first prediction model.

Using the traffic flow data, it is possible to consider the impact of electric vehicles and other vehicles that need to be charged on the total power consumption data, which can improve the accuracy of predicting the total power consumption data. Using the weather forecast data, it is possible to consider the impact of weather on residential self-power-generation data and total power consumption data, so as to improve the accuracy of power-supply prediction and total power consumption data.

In some embodiments of the present disclosure, by inputting the first power-generation data which includes the first distribution information and the second distribution information, and the environmental data which includes weather forecast data and traffic flow data into the first prediction model, the model output may be more refined to consider the actual power demand and power supply conditions of the power-supply prediction, which further improves the accuracy of power-supply prediction.

FIG. 5 is a flowchart illustrating an exemplary process for determining the first power demand according to some embodiments of the present disclosure. As shown in FIG. 5, process 500 includes the following steps. In some embodiments, the process 500 may be performed by the urban power-supply management platform 210.

In some embodiments, the traffic flow data may be configured to predict the first power demand.

The first power demand may refer to the power consumption in a certain area. In some embodiments, the urban power-supply management platform 210 may determine the first power demand by the following steps.

In step 510, the urban power-supply management platform 210 may divide the areas where the power supply terminal is located according to the trunk roads (e.g., main road) of road traffic.

The areas where the power supply terminal is located may refer to the area where the self-power-generation house is located.

The trunk road of road traffic may refer to the main road in road traffic in the area where the power supply terminal is located, which can connect various functional areas for the passage of motor vehicles, for example, Chaoyang Avenue in the map.

In some embodiments, the urban power-supply management platform may divide the area where the power supply terminal is located according to the trunk road in the area where the power supply terminal is located or the main road of road traffic in the vicinity in the map. The manner of dividing may include but is not limited to the relative position between the area where the power supply terminal is located and the trunk road, the boundary of the trunk road and the trunk road, etc.

The relative position between the area where the power supply terminal is located and the trunk road may refer to the relative geographic orientation of the area where the power supply terminal is located and the trunk road. The boundary of the trunk road and the trunk road may refer to the boundary between the trunk road and the trunk road. For example, if the area P where the power supply terminal is located contains two parallel trunk roads A and B, the urban power-supply management platform may divide the area P where the power supply terminal is located into area a, area b, and area c based on the trunk road A and the trunk road B. For example, area a is located below the trunk road A, area b is located between trunk road A and the trunk road B, and area c is located above trunk road B.

In step 520, the urban power-supply management platform 210 obtains the traffic flow at each divided area as an environmental feature.

Traffic flow can refer to the number of vehicles passing on a certain road point in a certain period of time. For example, on a certain road point, the traffic flow from 8:00 a.m. to 9:00 a.m. is 8.2 vehicles/minute.

The environmental feature may refer to the feature determined for model processing based on the traffic flow in each divided area. In some embodiments, the environmental feature may be represented in a variety of ways, such as words, numbers, etc. For example, "less of vehicles", and "10", etc. Numbers may represent the volume of the vehicle traffic. In some embodiments, the urban power-supply management platform may directly determine the traffic flow as the environmental feature.

In some embodiments, the urban power-supply management platform may obtain the traffic flow of each divided area, and determine the environmental feature based on the traffic flow greater than the preset threshold. For example, the urban power-supply management platform may determine the environmental feature as "lots of vehicles" or "2" assuming that the traffic flow in the divided area is 10 vehicles/minute, which is greater than the preset threshold of 5 vehicles/minute. In some embodiments, the number, e.g., 2 may indicate how many times the traffic flow in the area is as large as the preset threshold.

In step 530, the urban power-supply management platform 210 determines the first power demand in each divided area based on the environmental feature through the power consumption prediction model.

The power consumption prediction model may be a model for obtaining the first power demand. In some embodiments, the power consumption prediction model may include any one or combination of a deep neural network model, a cyclic neural network model, a convolutional neural network, or other user-defined model structure.

In some embodiments, the input of the power consumption prediction model may be the environmental feature of a divided area and the first power generation data of the divided area, and its output may be the first power demand of the divided area. For example, input the environmental feature and the first power generation data of divided area a into the power consumption prediction model, which can output the first power demand of divided area a.

In some embodiments, the power consumption prediction model may be obtained based on training. The training of the power consumption prediction model may be performed by the urban power-supply management platform. The training of the power consumption prediction model may be realized based on the following methods.

The first step is to obtain at least one training sample and the initial power consumption prediction model. The training samples include the historical first power-generation data of different divided areas and the historical environmental features corresponding to different divided areas. The initial power consumption prediction model may be a power consumption prediction model without adjusting the model parameters or not meeting the training requirements. The count of training samples may be determined according to the accuracy requirements of the power consumption prediction model, actual application scenarios, and other factors.

In some embodiments, the urban power-supply management platform may obtain the historical first power-generation data of different divided areas and the historical environmental features corresponding to different divided areas from the storage device as training samples. In some embodiments, the urban power-supply management platform may take the historical first power-generation data of different divided areas and the historical environmental features corresponding to different divided areas as training samples based on the input by the personnel of the power supply companies.

In some embodiments, the label of the training samples may be the first power demand for different divided areas. In some embodiments, the label of the training sample may be obtained by manual labeling, or by obtaining the first power demand in the history of different divide areas that have been labeled as the training samples, so as to save the manual labeling process, and the labeling can be the first power-generation data and the environmental features.

In the second step, iteratively update the parameters of the initial power consumption prediction model based on at least one training sample to obtain the power consumption prediction model.

In some embodiments, the training samples may be input into the initial power consumption prediction model, and the parameters of the initial power consumption prediction model may be updated through training iteration until the trained power consumption prediction model meets the preset condition, and the trained power consumption prediction model may be obtained. The preset condition may be that the loss function is less than the threshold, convergence, or the training cycle reaches the threshold. In some embodiments, the method of iteratively updating model parameters may include model training methods such as random gradient descent.

In some embodiments, the urban power-supply management platform may determine the first power demand of different divided areas through the power consumption prediction model based on the environmental features of different divided areas and the first power generation data corresponding to the different divided areas. For example, the urban power-supply management platform may determine the first power demand data of divided area a and the first power demand data of divided area b through the power consumption prediction model based on the environmental feature and the first power generation data of divided area a, and the environmental feature and the first power generation data of divided area b.

In some embodiments, the urban power-supply management platform may determine the power-supply prediction of a divided area based on the difference between the first power demand of the divided area and the power generation corresponding to the divided area.

Some embodiments of the present disclosure may include dividing the area where power supply terminal is located into different areas and determine the environmental features of different divided areas. Further, based on the environmental features of different divided areas and the first power generation data corresponding to the divided areas, the first power demands of the different divided areas are determined. With this setting, the first power demand of different areas may be accurately and finely determined, and the accuracy of power-supply prediction can be further improved.

When the sensor network platform obtains the second power-generation data from the collection terminal, the sensor network platform may obtain the second power-generation data from the smart meter and the energy router. For different power generation modes, the collection terminals are also different. After determining the different power generation modes and their corresponding collection terminals, the difficulty of obtaining the second power-generation data from different power generation modes may be reduced. Therefore, it is necessary to know the collection terminals corresponding to the power generation modes.

In some embodiments, the urban power-supply management platform may send the division of power generation modes and the distribution information of power generation modes to the sensor network platform. The sensor network platform may determine the collection terminals according to the division of power generation. For example, the sensor network platform may determine the collection terminal as a smart meter based on the power generation mode as the solar power. As another example, the sensor network platform may determine the collection terminal as an energy router according to the power generation mode as wind power generation.

By determining the collection terminals according to the division of power generation modes, the sensor network platform may determine different power generation modes and their corresponding collection terminals, so as to reduce the difficulty of obtaining the second power-generation data from different power generation modes.

In order to further improve the accuracy of determining the power-supply prediction, the area information may also be sub-divided when the first power-generation data is determined.

In some embodiments, the urban power-supply management platform may sub-divide the area information according to the dividing areas of the sensor network platform, send the sub-division result to the sensor network platform, and the sensor network platform determines the first power-generation data according to the sub-division result.

The area information may refer to the information (e.g., the range of the divided area a, the range of the divided area b, or the like) related to the area obtained by dividing the area where the power supply terminal is located according to the trunk road of road traffic. In some embodiments, the urban power-supply management platform may obtain area information according to the manner of dividing areas. For example, based on the division of the above example, the range of the divided area a, the range of the divided area b, and the range of the divided area c may be obtained.

Figure 6:
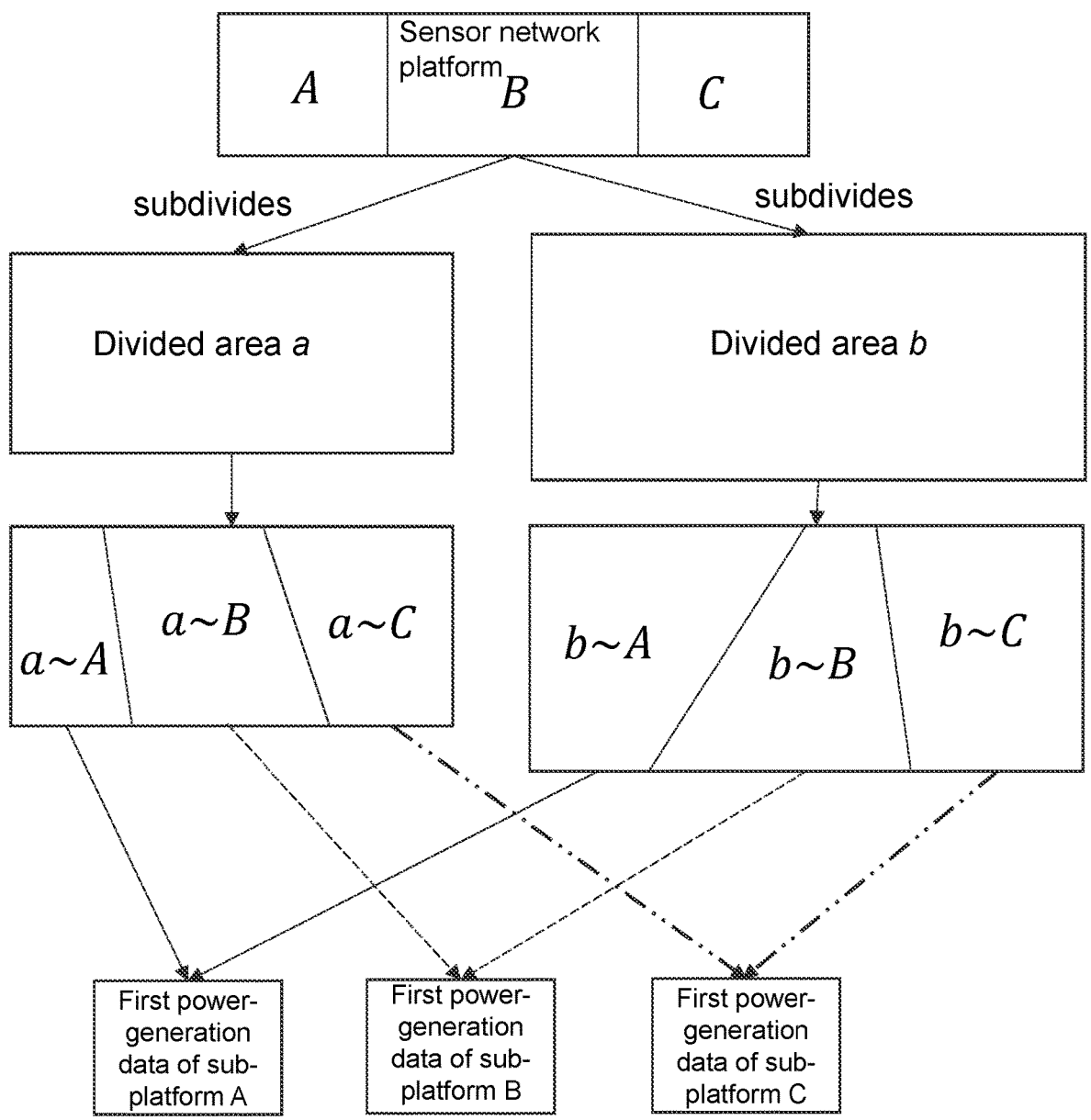
FIG. 6 is a schematic diagram illustrating an exemplary process for determining the first power-generation data based on sub-dividing according to some embodiments of the present disclosure.

The dividing areas of the sensor network platform may refer to multiple independent areas formed by dividing the sensor network platform. Each independent area may be referred to as the sub-platform of the sensor network platform, that is, the sensor network platform may be composed of multiple sub platforms. For example, as shown in FIG. 6, if the sensor network platform is composed of sub-platforms A, B, and C, the dividing areas of the sensor network platform may refer to sub-platforms A, B, and C.

In some embodiments, a dividing area of the sensor network platform may manage a portion of the divided area described above. The management may refer to the processing of data in the area. For example, if sub-platform A can obtain the second power-generation data of the part of the divided area a, the sub-platform A may manage the part of the divided area a.

The sub division according to the dividing areas of the sensor network platform may be performed based on the dividing areas of the sensor network platform and a portion (e.g., an area) that each dividing area manages. For example, when dividing a divided area a, if the dividing areas of the sensor network platform are sub-platforms A, B, and C, and sub-platforms A, B, and C respectively manage different areas in the divided area a, and the divided area a may be divided into three areas according to the dividing areas of the sensor network platform, that is, areas a~A, b~B, and c~C, which respectively represent the areas managed by sub-platforms A, B and C in area a.

In some embodiments, the urban power-supply management platform may sub-divide the area information according to the dividing areas of the sensor network platform and send the sub-division result to the sensor network platform. The sensor network platform determines the first power-generation data of the dividing areas of the sensor network platform based on the sub-division result and the dividing areas of the sensor network platform.

For a clearer explanation, the following will be explained in combination with FIG. 6. For example, the dividing areas of the sensor network platform are sub-platforms A, B, and C, as shown in the process 600 of FIG. 6, the urban power-supply management platform sub-divides area a according to the dividing areas of the sensor network platform to obtain three sub-divided areas, which may be expressed as area a~A, area a~B, and area a~C, respectively. The urban power supply management platform sub-divides area b according to the dividing areas of the sensor network platform, the three sub-divided areas obtained may be expressed as area b~A, area b~B, area b~C. Wherein, the content before"~" may indicate the area to which the sub-divided area belongs, e.g., a~indicates that it belongs to the divided area a, and the content after "~" may indicate the basis for division is the dividing areas of the sensor network platform, e.g., ~A indicates that the sub-division is performed according to the sub-platform A.

The urban power-supply management platform sends the sub-divided areas, e.g., area a~A, area a~B, area a~C, area b~A, area b~B, area b~C, to the sensor network platform. The sensor network platform may determine that the first power-generation data of the sub-platform A is the sum of the power generation data of a~A and b~A, the first power generation data of sub-platform B is the sum of the power generation data of a~B and b~B, and the first power generation data of sub-platform C is the sum of the power generation data of a~C and b~C.

By sub-dividing the area information according to the dividing areas of the sensor network platform, the power generation data of each sub-divided area obtained by sub-dividing is determined, and then the first power generation data of the dividing areas of the sensor network platform is determined. With this setting, the first power generation data of each dividing area of each sensor network platform may be determined, and then the power-supply prediction of the different dividing areas of the sensor network platforms may be finely determined.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." Unless otherwise stated, "about", "approximate" or "substantially" may indicate a ±20% variation of the value it describes. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method of power-supply management in a smart urban based on Internet of things (IoT), performed by an urban power-supply management platform of a system for power-supply management in the smart urban based on IoT, wherein the system is a part of a processing device or implemented by the processing device; and the system further comprises a sensor network platform and an object platform, wherein the urban power-supply management platform realize overall planning and coordination of connection and cooperation between various functional platforms; and the urban power-supply management platform gathers information of an operating system of the IoT, and provides perceptual management and control management functions for the operation system of the IoT;

the sensor network platform connects the urban power-supply management platform and the object platform, and plays functions of perceptual information sensing communication and control information sensing communication; and the sensor network platform is configured as a sensor network management server;

the object platform is a functional platform for performing perceptual information generation and control information; the sensor network platform communicates with the object platform, wherein the object platform is configured as a collection terminal and configured to obtain second power-generation data, and the collection terminal includes an intelligent meter or an energy router; wherein the smart meter is configured to collect self-power-generation data from each residential user, and the energy router is configured to collect self-power-generation data from multiple residential users in one or more communities;

the method comprising:

obtaining first power-generation data by the urban power-supply management platform communicating with the sensor network platform, wherein the first power-generation data is determined by summarizing the second power-generation data through network communication between the sensor network platform and the collection terminal, and the second power-generation data is residential self-power-generation data; wherein the second power-generation data is obtained from the collection terminal by the sensor network platform; wherein the first power-generation data is determined based on a process including:

sending, by the urban power-supply management platform, division of power generation modes and distribution information of power generation modes to the sensor network platform; determining, by the sensor network platform, the collection terminal according to the division of power generation modes; sub-dividing, by the urban power-supply management platform, area information according to dividing areas of the sensor network platform, sending a sub-division result to the sensor network platform, and determining, by the sensor network platform, the first power-generation data according to the sub-division result;

determining, by a first prediction model, a power-supply prediction based on the first power-generation data and environmental data; wherein the first power-generation data includes at least one of first distribution information and second distribution information of the residential self-power-generation data, wherein the first distribution information includes distribution information according to power-generation mode, and the second distribution information includes distribution information according to time; and the environmental data includes weather forecast data and traffic flow data; wherein the environmental data is obtained from the storage device or through invoking weather API by the urban power-supply management platform; and transmitting, by the urban power-supply management platform, the power-supply prediction to a power-supply company through the sensor network platform; and adjusting, by the power-supply company, power supply of different areas based on the power-supply prediction.

2. The method of claim 1, wherein the obtaining the first power-generation data by the sensor network platform comprises:

obtaining, by the sensor network platform, the second power-generation data from the collection terminal in a staggered manner;

determining, by the sensor network platform, the first power-generation data based on the summary processing of the second power-generation data; and obtaining, by the sensor network platform, the first power-generation data in the staggered manner; wherein the staggered manner refers to not carrying out different steps or operations at the same time; and the staggered manner include obtaining or uploading the power-generation data of different communities at different time periods.

3. The method of claim 1, wherein the traffic flow data is used to predict a first power demand; wherein the predicting the first power demand comprises:

dividing an area where the power-supply terminal is located based on a main road of road traffic;

obtaining a traffic flow of each divided area as an environmental feature; and determining, by a power consumption prediction model, the first power demand in the each divided area based on the environmental feature.

4. A system for power-supply management in a smart urban based on Internet of things (IoT), wherein the system comprises an urban power-supply management platform, a sensor network platform, and an object platform, wherein the system is a part of a processing device or implemented by the processing device; wherein the urban power-supply management platform realize overall planning and coordination of connection and cooperation between various functional platforms; and the urban power-supply management platform gathers information of an operating system of the IoT, and provides perceptual management and control management functions for the operation system of the IoT;

the sensor network platform connects the urban power-supply management platform and the object platform, and plays functions of perceptual information sensing communication and control information sensing communication; and the sensor network platform is configured as a sensor network management server;

the object platform is a functional platform for performing perceptual information generation and control information; the sensor network platform communicates with the object platform, wherein the object platform is configured as a collection terminal and configured to obtain second power-generation data, and the collection terminal includes an intelligent meter or an energy router; wherein the smart meter is configured to collect self-power-generation data from each residential user, and the energy router is configured to collect self-power-generation data from multiple residential users in one or more communities;

wherein the urban power-supply management platform is configured to perform the following operations including:

obtaining first power-generation data by the urban power-supply management platform communicating with the sensor network platform, wherein the first power-generation data is determined by summarizing the second power-generation data through network communication between the sensor network platform and the collection terminal, and the second power-generation data is residential self-power-generation data; wherein the second power-generation data is obtained from the collection terminal by the sensor network platform; wherein the first power-generation data is determined based on a process including:
  sending, by the urban power-supply management platform, division of power generation modes and distribution information of power generation modes to the sensor network platform; determining, by the sensor network platform, the collection terminal according to the division of power generation modes; sub-dividing, by the urban power-supply management platform, area information according to dividing areas of the sensor network platform, sending a sub-division result to the sensor network platform, and determining, by the sensor network platform, the first power-generation data according to the sub-division result;
  determining, by a first prediction model, a power-supply prediction based on the first power-generation data and environmental data; wherein
    the first power-generation data includes at least one of first distribution information and second distribution information of the residential self-power-generation data, wherein the first distribution information includes distribution information according to power-generation mode, and the second distribution information includes distribution information according to time; and
    the environmental data includes weather forecast data and traffic flow data; wherein the environmental data is obtained from the storage device or through invoking weather API by the urban power-supply management platform; and
  transmitting, by the urban power-supply management platform, the power-supply prediction to a power-supply company through the sensor network platform; and
  adjusting, by the power-supply company, power supply of different areas based on the power-supply prediction.

5. The system of claim 4, wherein the urban power-supply management platform is further configured to perform the following operations including:
  obtaining, by the sensor network platform, the second power-generation data from the collection terminal in a staggered manner;
  determining, by the sensor network platform, the first power-generation data based on the summary processing of the second power-generation data; and
  obtaining, by the sensor network platform, the first power-generation data in the staggered manner; wherein the staggered manner refers to not carrying out different steps or operations at the same time; and the staggered manner include obtaining or uploading the power-generation data of different communities at different time periods.

6. The system of claim 4, wherein the urban power-supply management platform is further configured to perform the following operations including:
  dividing an area where the power-supply terminal is located based on a main road of road traffic;
  obtaining a traffic flow of each divided area as an environmental feature; and
  determining, by a power consumption prediction model, the first power demand in the each divided area based on the environmental feature.

7. A computer-readable storage medium storing computer instructions, wherein when reading the computer instructions in the storage medium, a computer executes the method of power-supply management in a smart urban based on the Internet of things (IoT) according to claim 1.

8. The method of claim 1, wherein the first prediction model is a machine learning model; wherein the first prediction model is obtained by a training process including:
  training an initial first prediction model using a plurality of training samples with labels; wherein the training samples include historical first power-generation data, historical environmental data in a month, a quarter, and a year, the labels of the training samples are historical power supply data, and the labels of the training samples are obtained by manual marking;
  updating parameters of the initial first prediction model;
  ending training when the initial first prediction model satisfies a preset condition; and
  obtaining the first prediction model.

9. The method of claim 3, wherein the power consumption prediction model is obtained based on training, the training of the power consumption prediction model is performed by the urban power-supply management platform; wherein the training of the power consumption prediction model includes:
  obtaining at least one training sample with a label and an initial power consumption prediction model; wherein the at least one training sample includes historical first power-generation data of different divided areas and historical environmental features corresponding to the different divided areas, and the label is historical first power demand for the different divided areas;
  the initial power consumption prediction model is a power consumption prediction model without adjusting model parameters or not meeting a training requirement; and a count of the at least one training sample is determined according to accuracy requirements of the power consumption prediction model, actual application scenarios, and other factors;
  inputting the at least one training sample into the initial power consumption prediction model;
  iteratively updating parameters of the initial power consumption prediction model until meeting a preset condition; wherein the preset condition is a loss function less than a threshold, convergence of the loss function, or a training cycle reaching a threshold; and
  obtaining the power consumption prediction model.

10. The system of claim 4, wherein the first prediction model is a machine learning model; wherein the first prediction model is obtained by a training process including:
  training an initial first prediction model using a plurality of training samples with labels; wherein the training samples include historical first power-generation data, historical environmental data in a month, a quarter, and a year, the labels of the training samples are historical power supply data, and the labels of the training samples are obtained by manual marking;
  updating parameters of the initial first prediction model;
  ending training when the initial first prediction model satisfies a preset condition; and
  obtaining the first prediction model.

11. The system of claim 6, wherein the power consumption prediction model is obtained based on training, the training of the power consumption prediction model is performed by the urban power-supply management platform; wherein the training of the power consumption prediction model includes:
- obtaining at least one training sample with a label and an initial power consumption prediction model; wherein the at least one training sample includes historical first power-generation data of different divided areas and historical environmental features corresponding to the different divided areas, and the label is historical first power demand for the different divided areas;
- the initial power consumption prediction model is a power consumption prediction model without adjusting model parameters or not meeting a training requirement; and a count of the at least one training sample is determined according to accuracy requirements of the power consumption prediction model, actual application scenarios, and other factors;
- inputting the at least one training sample into the initial power consumption prediction model;
- iteratively updating parameters of the initial power consumption prediction model until meeting a preset condition; wherein the preset condition is a loss function less than a threshold, convergence of the loss function, or a training cycle reaching a threshold; and
- obtaining the power consumption prediction model.

* * * * *